2,959,499
Patented Nov. 8, 1960

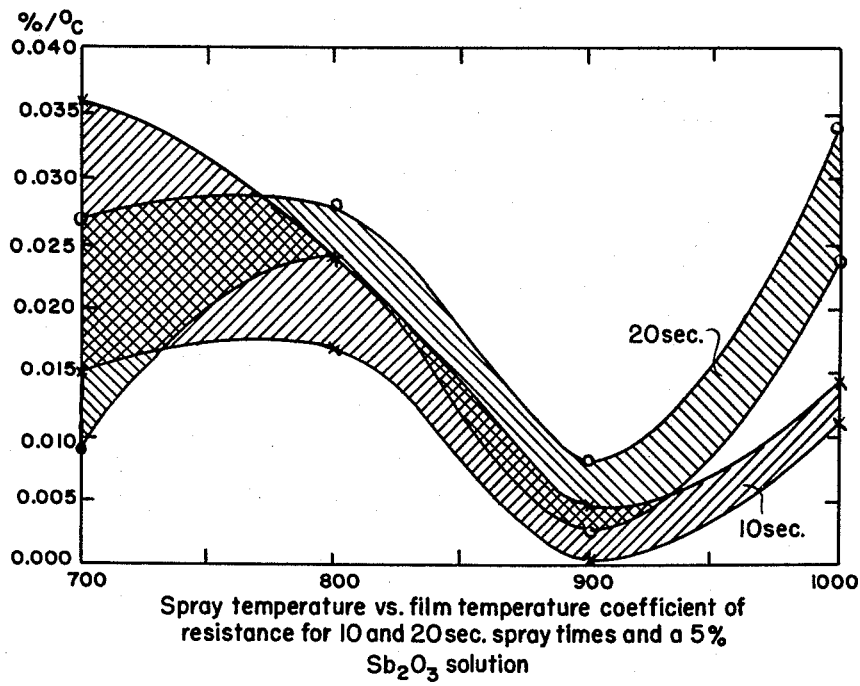
Spray temperature vs. film temperature coefficient of resistance for 10 and 20 sec. spray times and a 5% $Sb_2O_3$ solution
FIG. 2
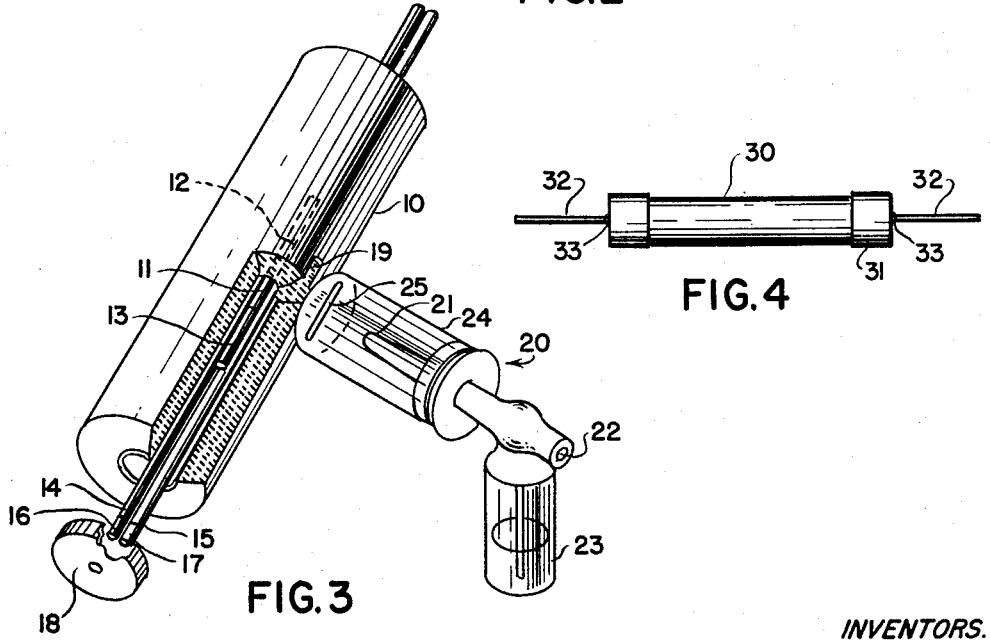
FIG. 3
FIG. 4
INVENTORS.
Andrew Herczog,
Herbert Packer,
Arthur E. Middleton.

2,959,499

ART OF PRODUCING ELECTROCONDUCTIVE FILMS ON A REFRACTORY CERAMIC BASE

Andrew Herczog, Horseheads, N.Y., and Herbert Packer and Arthur E. Middleton, Cleveland, Ohio, assignors to P. R. Mallory & Co. Inc., Indianapolis, Ind., a corporation of Delaware Filed Mar. 7, 1958, Ser. No. 719,942

7 Claims. (Cl. 117—229)

This invention relates to ceramic bodies having electrically conducting oxide coatings thereon, and, more particularly, to electrical resistance devices comprising oxide coatings of the described character on a refractory ceramic base, capable of being operated at high temperatures.

As is known, when glass, or some other vitreous ceramic body is heated and is brought into contact with certain metal salts, such as with suitable salts of tin, antimony, indium, or cadmium, in the form of fumes or atomized solutions thereof, a strongly adherent, conducting layer of oxide is formed on its surface. This process is generally designated as that of iridizing because the produced coatings are sufficiently thin as to be iridescent. Electrically conductive oxide coatings of this type permanently incorporated with glass or some other vitreous base have been found useful as electrical resistance or heating devices due to their good chemical and thermal stability. However, these prior processes of producing electrically conductive coatings had to be carried out at relatively low temperatures, the maximum recommended deposition temperature being 700° C. for vitreous base materials. It was difficult to build up conductive coatings or films thicker than 1 micron. Also, electrical resistances made by these conventional procedures had serious limitations as to operating temperatures and, in general, could not be operated satisfactorily at temperatures above 300° to 400° C. due to softening of the vitreous base and deterioration of the oxide film. In using bases of quartz or of high silica glasses, considerable practical difficulties were encountered owing to the low thermal expansion coefficients of these materials which did not match the expansion coefficients of the oxide film and of the metals used for making high temperature terminal connections to the resistance film. Finally, prior attempts to apply the conventional deposition process to refractory ceramic bases of high softening point likewise failed to provide electrical resistances suitable for operation at temperatures above 400° C. since the stability and other electrical characteristics of the resistances were unsatisfactory. This was due to the surface roughness or porosity of the base as compared with vitreous materials and, in some cases, to the tendency of the oxide films to be absorbed in the base at such temperatures. Although various suggestions and proposals were made to improve these conventional deposition processes and to adapt them to the manufacture of electrical resistance devices comprising refractory ceramic bases and satisfactory for operation at temperatures above 400° C., none, as far as we are aware, of these suggestions and proposals were completely satisfactory or successful when carried into practice on a practical and commercial scale.

It has been discovered that the outstanding problem may be solved in a remarkably simple manner.

It is an object of the present invention to improve electroconductive coatings or films produced on refractory ceramic bodies.

It is another object of the present invention to provide electrical resistance devices comprising a refractory ceramic base having an electroconductive oxide coating permanently bonded therewith, characterized by constant and reproducible resistance values and by practically constant predetermined temperature coefficients of resistance within a very wide range of operating temperatures, such as between −65° C. and 500° C.

It is also within contemplation of the present invention to provide a novel and improved method of producing electroconductive films and resistances on refractory bodies of high softening point at heretofore unobtainable elevated temperatures of deposition through critical control of the deposition temperature within a narrow range.

The invention also contemplates an improved deposition apparatus for producing electroconductive films and electrical resistances suitable for carrying the method of the invention into practice.

Other and further objects and advantages of the present invention will become apparent from the following description, taken in conjunction with the accompanying drawings, in which Fig. 1a is a series of graphs showing the change in resistance value at room temperature after heat treatment at 500° C., as a function of film composition and spray temperature;

Fig. 2 is a composite graph illustrating the relationship between the spray temperature and the temperature coefficient of resistance of the film for a spraying solution of preferred composition and for spray times of 10 and 20 seconds, respectively;

Fig. 3 is a perspective view, somewhat diagrammatic and fragmentary in character and having parts broken away for clarity of illustration, of a preferred form of apparatus suitable for carrying the method of the invention into practice; and Fig. 4 is a side elevational view of an electrical resistance embodying the invention.

Figure 1:
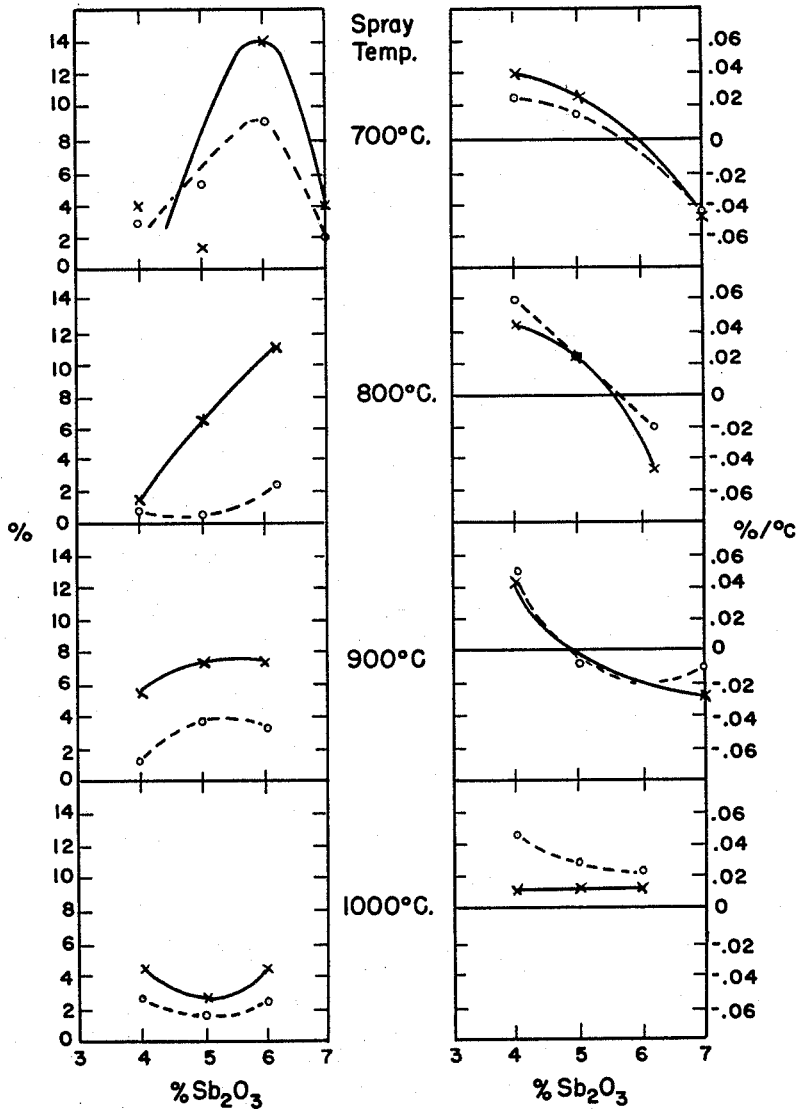
Fig. 1b is a series of similar graphs showing the change in the temperature coefficient of resistance from room temperature to 500° C., as a function of film composition and spray temperature.

Broadly stated, in one of its important aspects, the invention contemplates a novel method of depositing electrically conducting resistance films on alkali-free ceramic bases, such as zircon, aluminum oxide, or statite, having a softening point of 1400° C., or higher. The deposited films have a thickness of between 0.1 to 10 microns and are essentially composed of tin oxide with addition of a minor proportion of antimony, indium, or cadmium oxide, the preferred film material being tin oxide with 2 to 10% by weight antimony oxide added. In its preferred form, the method comprises thermal decomposition of a mist or vapor produced from an aqueous solution of suitable compounds, such as chlorides of tin and antimony, on the surface of a ceramic base heated at a temperature within the range of 750° and 1050° C. By controlling the flow of reacting vapors, the flow of the gas carrying the mist or vapors, and the heat supply to the ceramic base during film deposition, the reaction temperature is kept within ±30° C. of the desired value. The films prepared under the proper conditions according to the invention have a uniform thickness and show a reproducible value of resistance under heat cycling from −65° C. to 500° C. or higher, depending on the temperature of film formation. They can be made with a practically constant value of temperature coefficient of resistance over this entire temperature range and the said temperature coefficient of resistance can be made to be either close to zero, positive, or negative, according to the percentage of antimony oxide in the film, the deposition temperature and the expansion coefficient and other characteristics of the ceramic base.

In accordance with the principles of the present invention, it is critically important to maintain the reaction temperature at which the spray is brought into contact with the ceramic body or base within a narrow range, such as within ±30° C. of the selected temperature. This, of course, was practically impossible to accomplish with the conventional iridizing processes where generally the entire surface of the base was simultaneously exposed to the spray, resulting in excessive cooling. We have discovered that this difficulty can be eliminated and the critically important constant reaction temperatures can be readily maintained by exposing the refractory ceramic base to the spray in a progressive manner, so that only a small portion of the entire area of the base is exposed to the spray at any time. This simple expedient permits balancing the heat supply to the base by the furnace and the heat withdrawal from the base by the spray with great accuracy and makes it possible to manumacture electrical resistance devices having desirable and reproducible characteristics expediently and at a low cost. In general, the spray can be applied to a nearly constant temperature to an elongated portion of the surface of the base, provided that the width of the portions sprayed at any time is smaller than the thickness of the base and the base is kept in motion during spraying in order to successfully expose its surface to the spray at least once but preferably several times, while the base is heated by radiation for maintaining a constant temperature during the whole operation. Thus, when spraying ceramic bases of cylindrical shape, consistently satisfactory results are obtained when there is at no time more than 25% of the entire surface area of the base exposed to the spray and the base is rotated around its longitudinal axis until its entire surface has been covered by the spray once or several times.

Referring now more particularly to Fig. 3 of the drawing, the method of the invention will be more fully explained in connection with a preferred form of apparatus adapted for depositing conducting films on ceramic rods. Reference numeral 10 denotes a hollow, generally cylindrical furnace made of refractory material and maintained at the selected deposition temperature between 750° and 1050° C. by suitable heating means, such as an electrical heater element (not shown). The cylindrical base piece 11 of ceramic material, such as steatite, to be coated is placed between two similar pieces of ceramic 12 and 13 to prevent excessive cooling of piece 11 at its ends. Base piece 11 may be a round ceramic rod ¼″ in diameter and 1½″ long. All three ceramic pieces 11, 12 and 13 are resting between a pair of parallel-spaced cylindrical supporting rods 14 and 15 running through the inside of the heated furnace and mounted for rotation in suitable bearing means (not shown). The circumferential end portions of supporting rods 14 and 15 are provided with uniformly spaced longitudinal grooves constituting pinions 16 and 17, respectively, meshing with a gear wheel 18. Thus, when gear wheel 18 is rotated at a slow and uniform rate by suitable driving means, both supporting rods and ceramic bodies 11, 12 and 13 resting thereon will be slowly rotated around their common longitudinal axes, progressively exposing portions of the circumferential surface of body 11 to the exterior through a horizontal slot 19 of rectangular shape provided in the furnace, having a length matching the length of the piece to be coated and having a width of about ⅛″.

Reference numeral 20 generally denotes a De Vilbiss medical spray gun provided with a Teflon tip 21 having a bore of 0.20″ and operated with an air flow of approximately 2 liters/minute introduced at inlet opening 22. The spray solution is prepared by dissolving enough $SnCl_4.5H_2O$ and $SbCl_3$ in 150 ml. of 25% hydrochloric acid so as to make a total of 43 g. of tin and antimony oxides. For example, for preparing a solution which upon spraying under the described operating conditions will result in the formation of a tin oxide film containing approximately 5% by weight of antimony oxide, 95 g. $SnCl_4.5H_2O$ and 3.4 g, $SbCl_3$ are dissolved in 150 ml. hydrochloric acid having a concentration of 25%. Of course, the proportions of $SnCl_4$ and $SbCl_3$ may vary according to the proportion of antimony oxide desired in the deposited film.

Due to the minute thickness of the film, its extremely small weight and its interaction with the base material, there are no satisfactory techniques available at the present time for determining the actual $Sb_2O_3$ content of the deposited $SnO_2$ film. It is customary in the art to calculate the $Sb_2O_3$ content of the films from the amount of $SbCl_3$ in the spraying solution. Thus, the statement that a given film contains 5% by weight $Sb_2O_3$ is intended to mean that in the fired product a proportion of 20 to 1 is expected between the $SnO_2$ and $Sb_2O_3$, or 5% by weight $Sb_2O_3$, upon simultaneously carrying out the following reactions:

$$SnCl_4+2H_2O \rightarrow SnO_2+4HCl$$
$$2SbCl_3+3H_2O \rightarrow Sb_2O_3+6HCl$$

The spraying solution is introduced into tank 23 of the spray gun. Tip 21 of the spray gun is surrounded by a container 24 having a slot 25 in the bottom surface which is similar in shape to but somewhat narrower than slot 19 in the furnace. Base 11, slots 19 and 25 and spraying tip 21 are exactly collimated so that the spray is successively passed through both slots before impinging upon the base. Using this arrangement, the spray acts only on about 20% of the area of the base piece at a time while the base is continuously heated by the furnace. The required uniform deposition on the ceramic base is achieved by rotation of the piece while spraying and by continuing the rotation until the total area of the piece is exposed to the directed spray at least once during the period of spraying. The quantity of air and solution brought into the furnace per second during spraying is kept close to the minimum amount necessary for producing the coating so as to avoid excessive cooling of the furnace atmosphere and of the hot ceramic base. Measurements taken with an optical pyrometer on the base piece before and at the end of a 20-second-long spraying period showed that when the initial temperature of the ceramic rod was 900° C., a decrease of 30° C. was the maximum drop below 900° C. while the film formation took place.

Besides the above discussed conditions of spraying, the further variables to be controlled are the film thickness, the deposition temperature, the percentage of antimony oxide present in the film and the thermal expansion coefficient of the base material.

The deposited oxide films of the invention are hard and are tenaciously adhering to the base with a color ranging from pale grey to blue-black, depending on the film thickness and the amount of antimony oxide present. Films can be made with a resistivity ranging from 10 ohms per square to 1000 ohms per square. By spiraling of films deposited on ceramic rods of ¼″ diameter and 1″ length, resistors of 1 megohm or higher resistivity can be made which show the same stability under heat cycling and the same temperature coefficient of resistivity as the unspiraled film. These properties render the resistances of the invention suitable for power and semiprecision type of resistors capable of operating at temperatures from −65° C., and lower, up to 500° C. and higher. An associated application of the invention is in improved precision type of resistors for operation up to temperatures of 200–250° C. Spiraling of the deposited films may be accomplished by various conventional procedures, such as by sandblasting a restricted area of the surface of the coated rod while continuously rotating and axially displacing the rod with respect to the sand blast.

The data shown in the graphs of Figs. 1a and 1b have been obtained with alkaline earth ceramic bases having a linear thermal expansion coefficient of $4.10^{-6}$. Fig. 1a indicates the relationship between the change in resistance at room temperature after heat treatment at 500° C. of resistances of different composition and the spraying temperature and time. It will be noted that the smallest change in resistance of the oxide resistor films after heat treatment at 500° C. is obtained for a deposition temperature of 900° C., or higher, and the optimum concentration of antimony oxide is between 4% and 5% by weight. For thicker films produced with a spray time of 20 seconds, the results are somewhat better. Fig. 1b indicates the change of temperature coefficient of resistance from room temperature to 500° C. for resistances of different composition produced at different spraying temperatures and times. It will be noted that the temperature coefficient of resistance passes through zero at 5 to 6% antimony concentration as a function of the reaction temperature. For example, for a given ceramic base material, a 900° C. deposition temperature and a solution containing sufficient $SbCl_3$ to result in formation of a film having a $Sb_2O_3$ content of 5% by weight represent optimum conditions for the method of the invetnion.

The composite graph of Fig. 2 shows the temperature coefficient of resistance of the film as a function of spray temperature for 10- and 20-second spray times and for a solution containing sufficient $SbCl_3$ to produce a film calculated to have a $Sb_2O_3$ content of 5% by weight. from this graph, it appears that the optimum value of the temperature coefficient of resistance is obtained at a spraying temperature of about 900° C., and further that for this condition the influence of film thickness (spray time) on the temperature coefficient of resistance is also the smallest. The poor reproducibility of films prepared at lower deposition temperatures, such as at 700° C. or less, is clearly apparent from this graph.

In general, the higher the deposition temperature, the higher is the electrical and chemical stability of the films at elevated operating temperatures. However, when the furnace temperature is increased above 1050° C., the films produced show increasingly higher resistivity and a larger, negative temperature coefficient of resistance, due to evaporation of the antimony oxide. The films deposited at or above 1050° C. are colorless and transparent, indicating deficiency or lack of antimony oxide due to evaporation at this temperature.

The following table shows the relations between spraying time, resistivity and film thickness for films deposited at 900° C. from a solution containing sufficient $SbCl_3$ to produce a film having a $Sb_2O_3$ content of 5% by weight.

| Spray Time | Resistance in Ohms per Square | Thickness in Microns |
| --- | --- | --- |
| 5 seconds | 240 | 0.4 |
| 10 seconds | 100 | 1.0 |
| 20 seconds | 30 | 2.4 |

By changing the spray time to shorter or longer times than those listed in the table, it is possible to produce film thicknesses down to 0.1 micron and up to 10 microns, respectively.

The electrical stability of films below a thickness of 0.5 micron is less satisfactory at 500° C. than for thicker films on ceramic bases characterized by a somewhat higher expansion coefficient, for example, on a steatite base having an expansion coefficient of $6.10^{-6}$, the stability of 0.5 micron thick films is improved. Similar improvement can be obtained by increasing the concentration of antimony in the spray solution. For this reason, it is assumed that for one chosen concentration of $SbCl_3$ in the spraying solution, less antimony oxide will be trapped in this film than in thicker films and that this effect might be due to evaporation of antimony oxide during processing.

Further work indicates that for normal or thicker films, such as films over 0.5 micron in thickness, the best characteristics are obtained when bases with selected and different coefficients of thermal expansion are used for different concentrations of antimony oxide in the tin oxide-antimony oxide-producing spray.

For most practical applications, it is desirable to provide the electrical resistances of the invention with metallic end terminals. This may be accomplished, for example, by coating the terminal portions of the ceramic rod bearing the oxide film with a suitable silver composition for a distance of about ⅛" from the ends. The coating of silver composition, which in some cases may contain various amounts of glass, may be applied by painting, rolling, silk screening and similar procedures. The rods are then fired at 650° C. for 20 minutes, or more, to convert the silver composition into metallic silver. A silver or Inconel end cap with a coating of similar silver composition on the inside is forced on each end over the fired and strongly adherent silver terminal connection to the oxide film. Subsequently, the whole assembly is again fired at 600–700° C. A resistance of the described type is illustrated in Fig. 4, in which reference numeral 30 denotes the ceramic rod or base with the oxide film thereon, 31 the silver end caps and 32 the lead wires brazed, welded or otherwise secured to the cap, as indicated at 33. The resulting connections show low electrical resistance, good bonding and satisfactory mechanical strength under the pull test of applying 5–20 lbs. tension on the lead wires.

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

What is claimed is:

1. The method of producing an electrically conducting film on a ceramic base which comprises heating the base to a temperature selected from the range between 750° and 1050° C., contacting said heated base with a spray of a solution comprising a metal compound of at least one of the metals selected from the group consisting of tin, antimony, indium and cadmium capable of thermal decomposition, and controlling the rate of contact between said base and said spray to maintain the temperature of said base within ±30° C. of the said selected temperature.

2. The method of producing an electrically conducting film on a refractory ceramic base having a softening point of at least 1400° C. which comprises heating the base to a temperature selected from the range between 750° and 1050° C., contacting said heated base with a spray of a solution comprising a chloride of at least one of the metals selected from the group consisting of tin, antimony, indium and cadmium to cause the formation of a conducting film of the oxides of said metals on the base, and correlating the heat supplied to the base and the heat withdrawn therefrom by said spray in such a manner as to maintain the temperature of said base within ±30° C. of the said selected temperature.

3. The method of producing an electrically conducting film on a refractory ceramic base which comprises heating the base to a temperature selected from the range between 750° and 1050° C., exposing said heated base to a spray of a solution comprising chlorides of tin and antimony to cause thermal reaction of said spray with and the formation of a conducting film of tin and antimony oxides on said base, and controlling the temperature of said reaction to maintain it within ±30° C. of the said selected temperature.

4. The method of producing an electrically conducting film essentially composed of oxides of tin and antimony on a refractory ceramic base which comprises heating the base to a temperature selected from the range between 750° and 1050° C., progressively exposing elongated surface portions of said heated base to a spray of a solution comprising a major amount of tin chloride and a minor amount of antimony chloride thereby to cause thermal decomposition of said chlorides and conversion thereof into oxides of the respective metals, and so controlling said progressive exposure that the width of the surface portion of the base exposed to said spray at any time is smaller than the thickness of the base whereby the temperature of said base is maintained within ±30° C. of the said selected temperature.

5. The method of producing an electrically conducting film essentially composed of tin oxide containing about 2% to 10% by weight of antimony oxide on a refractory ceramic base which comprises heating the base to a temperature selected from the range between 750° and 1050° C., applying to the base through a narrow slot a spray of a solution of tin and antimony chlorides, and causing relative displacement of said base with respect to said spray thereby progressively to expose said heated base to said spray to form a uniform deposit of said conducting oxides thereon while maintaining the temperature of said base within ±30° C. of said selected temperature.

6. The method of producing an electrically conducting film essentially composed of a major portion of tin oxide and a minor portion of about 2% to 10% by weight of antimony oxide on a refractory ceramic base which comprises heating said base to a selected temperature between 750° and 1050° C., spraying through a narrow slot an elongated area of the base the width of which is smaller than the thickness of said base with a mixture of vaporized tin and antimony chlorides, and displacing the said base with respect to said slot at a uniform rate thereby to expose the total area of the base to said spray at least once during the period of spraying while maintaining the temperature of said base within ±30° C. of said selected temperature.

7. The method of producing an electrically conducting film essentially composed of a major portion of tin oxide and a minor portion of about 2% to 10% of antimony oxide on a generally cylindrical refractory ceramic rod which comprises mounting said rod for rotation together with a similar rod at each end thereof to prevent end cooling effects, heating said rods to a selected temperature between 750° and 1050° C., rotating said rods at a uniform rate, and directing during such rotation against the circumferential surface of the center rod an elongated narrow spray composed of a mixture of vaporized tin and antimony chlorides, the dimensions of said spray being so determined with respect to those of the ceramic rod that at any time not more than 25% of the circumferential surface of the rod is exposed to the spray whereby the temperature of said rod is maintained within ±30° C. of the selected reaction temperature.

References Cited in the file of this patent

UNITED STATES PATENTS

| | | |
|---|---|---|
| 1,221,695 | Dann | Apr. 3, 1917 |
| 1,256,599 | Schoop | Feb. 19, 1918 |
| 2,564,706 | Mochel | Aug. 21, 1951 |
| 2,564,707 | Mochel | Aug. 21, 1951 |
| 2,648,752 | Saunders | Aug. 11, 1953 |
| 2,650,976 | Gaiser et al. | Sept. 1, 1953 |
| 2,671,034 | Steinfeld | Mar. 2, 1954 |
| 2,710,900 | Linder | June 14, 1955 |
| 2,784,114 | Miller | Mar. 5, 1957 |
| 2,785,997 | Marvin | Mar. 19, 1957 |
| 2,838,427 | Pugh | June 10, 1958 |